United States Patent
Jennings

(10) Patent No.: US 6,717,593 B1
(45) Date of Patent: Apr. 6, 2004

(54) MARK-UP LANGUAGE IMPLEMENTATION OF GRAPHICAL OR NON-GRAPHICAL USER INTERFACES

(75) Inventor: Terry D. Jennings, Westminster, CO (US)

(73) Assignee: Avaya Technology Corp., Basking Ridge, NJ (US)

( * ) Notice: Subject to any disclaimer, the term of this patent is extended or adjusted under 35 U.S.C. 154(b) by 504 days.

(21) Appl. No.: 09/660,315

(22) Filed: Sep. 12, 2000

(51) Int. Cl.⁷ .............................................. G06F 13/00
(52) U.S. Cl. ...................................... 345/760; 707/513
(58) Field of Search ................................ 345/760, 762; 707/513

(56) References Cited

U.S. PATENT DOCUMENTS

| | | | | |
|---|---|---|---|---|
| 5,945,989 | A | * | 8/1999 | Freishtat et al. |
| 6,118,446 | A | * | 9/2000 | Jones et al. ................. 345/762 |
| 6,430,624 | B1 | * | 8/2002 | Jamtgaard et al. |
| 6,449,636 | B1 | * | 9/2002 | Kredo et al. |
| 6,470,381 | B2 | * | 10/2002 | De Boor et al. |
| 6,477,549 | B1 | * | 11/2002 | Hishida et al. |
| 6,490,564 | B1 | * | 12/2002 | Dodrill et al. |
| 6,507,817 | B1 | * | 1/2003 | Wolfe et al. |
| 6,520,410 | B2 | * | 2/2003 | Putman et al. |

OTHER PUBLICATIONS

Marc Abrams and Constantinos Phanouriou, UIML: An XML Language for Building Device–Independent User Interfaces, http://www.harmonia.com/resources/papers/xml99Final.pdf, pp. 1–15.*

WhitePaper: The UIML Vision, Feb. 1, 2000, Harmonia. com, http://www.harmonia.com/resources/papers/whitepapers/UIMLVisionWhitePaperV5.pdf, pp. 1–7.*

CentruVu Computer Telephony, Lucent Technologies, 2/98, 3 pages, LT–GCC0453.*

Richard "Zippy" Grigonis & John Jainschigg, *Toward TML*, Computer Telephony.com, Aug. 1999, vol. 7, Issue 8, pp. 89–92.

*What is XML?*, Graphic Communications Association, Mar. 11, 1999, pp. 1–2, http://www.gca.org/whatxml/files/whatisxml.html.

Jon Bosak & Tim Bray, *XML and the Second–Generation Web*, Scientific American, May 1999, pp. 1–7, http://www.sciam.com/1999/0599issue/0599bosak.html.

*Introduction to a XUL Document*, Netscape, Jun. 30, 1999, pp. 1–8, http://www.mozilla.org/xpfe/xptoolkit/xulintro.html.

*XUL Language Spec*, Netscape, Jun. 23, 1989, pp. 1–8, http://www.mozilla.org/xpfe/languageSpec.html.

(List continued on next page.)

*Primary Examiner*—Cao (Kevin) Nguyen
(74) *Attorney, Agent, or Firm*—David Volejnicek

(57) ABSTRACT

Interface description documents define the appearance and behavior of a user interface (132) toward the user, and feature description documents define interaction of the interface with the interfaced-to application, both in conformity with a user-interface object model (310). Connector and layout object plug-ins (126, 128) define connector and layout objects for rendering elements of feature and interface description documents, respectively; of one or more interfaces. An interactor (130), independent of any interface or interface type, the application, and the user device (100, 200), generates user interfaces from the stored information. The interactor parses the description documents of an interface into elements and reflects them in the object model to form an instance representing the interface, downloads the objects corresponding to the reflected elements registers their interfaces in the object model instance to make them accessible by the elements, and invokes execution of each downloaded object with the corresponding element to render the element.

33 Claims, 16 Drawing Sheets

OTHER PUBLICATIONS

*Overview of a Package*, Netscape, pp. 1–4, http://www/mozilla.org/xpfe/xptoolkit/overview.html, Jul. 28, 1999.

*XPToolkit Architecture*, Netscape, Mar. 5, 1999, pp. 1–17, http://www/mozilla.org/xpfe/aom/AOM.html.

*New Layout: Parsing Engine*, Netscape, May 1, 1998, pp. 1–4, http://www.mozilla.org/newlayout/doc/parser.html.

*Plug–in Basics*, Netscape, Jan. 15, 1997, p. 1–14, http://developer.netscape.com/docs/manuals/communicator/plugin/basic.html.

*Plug–in API Reference*, Netscape, Jan. 15, 1997, pp. 1–9, http:developer.netscape.com/docs/manuals/communicator/plugin/refov.html.

*Master of Your DOM*, WDVL, 1998, p. 2, http://www.wdvl.com/Authoring/DHTML/DOM/master.html.

Aaron Weiss, *Netscape: The DOM*, WDVL, Nov. 19, 1998, pp. 1–4, http://www.wdvl.com/Authoring/DHTML/DOM/NS.html.

Aaron Weiss, *Refresher: XML*, WDVL, Dec. 21, 1998, pp. 1–2, http://wdvl.com/Authoring/Languages/XML/DOM/Intro/refresh_xml.html.

Aaron Weiss, *XML Objectified: IDOMNode's*, WDVL, Dec. 21, 1998, pp. 1–2, http://wdvl.com/Authoring/Languages/XML/DOM/Intro/idomnode.html.

*Level 1 Document Object Model Specification*, W3, Jul. 20, 1998, 83 pages, http://www.w3.org/TR/WD–DOM.

*CSS Ask Dr Web About Cascading Style Sheets*, http://www.zeldman.com/askdrweb/css.html.

*2 Introduction to CSS2*, W3, undated, pp. 1–8, http://www.w3.org/TR/REC–CSS2/intro.html, Jul. 27, 1999.

*CentreVu® Computer Telephony Server Software*, Lucent Technologies, Oct. 30, 1998, pp. 1–41, http://www/bcs.lucent.com/sales_market/oa/oa1998–090/98090one.html.

\* cited by examiner

```xml
<?xml version="1.0" standalone="no"?>
<!DOCTYPE application SYSTEM "tuiDTD.dtd">
<application name="MsgCore">
    <objects url="MessageObjects.xml"/>
    <tui>
        <menu name="main">
            <prolog id="a728"/>
            <help id="a2088 a728"/>
            <command token="1">
                <next submenu="create messages"/>
            </command>
            <command token="2">
                <next submenu="get messages"/>
            </command>
            <command token="3">
                <next submenu="administer greetings"/>
            </command>
            <command token="*4" type="help"></command>
        </menu>
        <menu name="get messages">
            <SCRIPT LANGUAGE="JavaScript">
                for( message = mailbox.folders["in"].first;
                     message != null;
                     message = mailbox.folders["in"].next ) {
                    // find appropriate id for this message—call it ann_id
                    ann_id = get_header_id( message )
                    user.session.announce( ann_id, message )
                }
            </SCRIPT>
        </menu>
        <menu name="create messages">
            <prolog id="a990"/>
            <help id="aXXX"/>
            <SCRIPT LANGUAGE="JavaScript">
                tmp_message = new tmpmsg
                tmp_voice = new component( "voice" )
                tmp_message.add_component( tmp_voice )
                tmp_message.from = user
                tmp_voice.record()
            </SCRIPT>
            <command token="1">
                <next submenu="edit message"/>
            </command>
            <command token="#">
                <next submenu="approve message"/>
            </command>
        </menu>
        ... // and so on for all other menus
    </tui>
</application>
```

```
<?xml version="1.0" standalone="no"?>
<!DOCTYPE application SYSTEM "features.dtd">
<application name="MsgCore">
     <feature name="greetings">
          <feature name="SimpleGreetings">
               <option name="ActiveGreeting" values="0,1"/>
          </feature>
          <feature name="MultiplePersonalGreetings">
               <option name="ActiveGreeting" values="0,1,2,3,4,5,6,7,8,9"/>
               <option name="CallType" values="busy,no answer,out-of-hours"/>
          </feature>
          <feature name="MultiLingualGreetings">
               <option name="ActiveGreeting" values="0,1,2"/>
               <option name="PrimaryLanguageChoice"/>
               <option name="SecondaryLanguageChoice"/>
          </feature>
     </feature>
</application>
```
124

*FIG. 5*

```
int
initialize()
{
} int
interact( StartSubTree, OutSubTree, OutURL )
char *StartSubTree, /* input */
char *OutSubTree,  /* output */
char *OutURL )     /* output */
{
} int
deinitialize()
{
}
```

MARK-UP LANGUAGE IMPLEMENTATION OF GRAPHICAL OR NON-GRAPHICAL USER INTERFACES

TECHNICAL FIELD

This invention relates to user interfaces in general, and to a telephony user interface in particular.

BACKGROUND OF THE INVENTION

Mark-up languages are languages for defining the content and structure (layout) of electronic documents. Most of the markup languages in use today are versions of the Standard Generalized Mark-up Language (SGML), which is a meta-language (a language for describing languages) standardized by the International Standards Organization (ISO). Examples of mark-up languages include the Hyper-Text Mark-up Language (HTML) which is an electronic publishing language that is used to define pages of information on the World Wide Web, Virtual Reality Mark-up Language (VRML) which is used to deliver three-dimensional images through the Internet, and Extensible Mark-up Language (XML) which is an abbreviated and simplified version of SGML that is designed to make information self-describing, and thus make it easier to define document types and to write programs to handle them.

Mark-up languages are most often used to describe electronic documents to browsers, although other applications can be used as clients. Their use allows the documents to be changed without impacting the browser, and allows the same browser to be used with different Web sites irrespective of server technology. The same type of flexibility is desirable for user interfaces. The desire is to be able to create user interfaces that can be changed or extended, or integrated with user interfaces of different other systems, without changes to the underlying systems.

The Mozilla organization of Netscape Communications Corporation has attempted to do this for graphical interfaces by defining the XML-based User Interface Language (XUL). XUL is an application of XML; it is XML with specific meanings defined for a few element types, and into which HTML and JavaScript can be scattered. XUL is designed to be used to define and develop graphical user interfaces (GUIs) which will work on multiple platforms (cross-platform GUIs). An additional benefit of designing a GUI in XUL is that it may be easily modified or expanded (added-to). However, not all platforms have, or can have, a GUI. A prime example are platforms like voice messaging systems and interactive voice response systems that interact with users via telephones and therefore must utilize a telephony user interface (TUI) made up of BDTMF (Touch-Tone) signals and/or spoken instructions. Since XUL is designed for GUIs only, XUL does not provide its benefits to these platforms.

Conversely, voice XML (VXML, XML combined with voice-recognition technology) is being used by a consortium of companies to provide a telephony user interface (TUI) to Web content. However, not all platforms have, or can have, a TUI. A prime example is conventional Web browsers, which are not voice-enabled. Since VXML is designed for TUI only, VXML does not provide its benefits to these platforms.

SUMMARY OF THE INVENTION

This invention is directed to solving the deficiencies of the prior art. Generally according to the invention, there is provided an arrangement for implementing user interfaces that is independent of the particular user interface or even the type of user interface (e.g., GUI or TUI) and that is also independent of the application being interfaced to as well as of the user device that is being interfaced. These dependencies are hidden from the arrangement by entities (e.g., data, plug-ins) that the arrangement can call on to implement a particular user interface, thereby leaving the arrangement generic. To modify an interface or to implement a new interface, only the referred-to entities need to be changed, but not the arrangement itself.

Specifically according to the invention, a user interface to an application is implemented as follows. A description document that defines a desired user interface comprising one or more definition elements (e.g., display pages, announcement menus) and a description document defining interaction of the user interface with the application and comprising one or more interaction elements (e.g., API functions) are generated, preferably in a markup language and a scripting language so that the user interface and changes thereto can be effected without a need to use and modify source code, and are stored. Both documents conform to a user interface object model. Also stored are a plurality of layout objects each comprising a control for rendering a different definition element, and a plurality of connector objects each comprising a control for rendering a different interaction element. The stored information hides dependencies—on the type of interface, the interface device, and the application—from the arrangement that actually creates the interface (referred to herein as an interactor). Then, to actually create the interface, the description documents are reflected into the object model to generate an instance of the object model that defines the user interface and comprises the definition elements and the interaction elements (illustratively expressed as markup and scripting language tags) of the description documents, and the corresponding layout object or connector object for each element in the object model instance is downloaded from storage and made accessible to its corresponding element, e.g., by the object registering its interface in the instance of the object model. The downloaded objects form a layout engine and a connector engine for the user interface. Thus, both the layout and connector engines are downloaded and created from parts as needed, as opposed to being fixed, thereby giving the arrangement great versatility and independence. Execution of each downloaded object is then invoked with the corresponding element of the object model; that is, each element of the object model instance is passed to its corresponding object in the engines and the object is executed to cause the object to render the element, thereby effecting the user interface to the application. Illustratively, for ease of access, each element is represented by a name, a URL and/or an XML tag.

Preferably, a plurality of description documents, defining a plurality of different user interfaces—be they different interfaces to the same application or interfaces to different applications—is stored. These are then used to generate the object models for the different interfaces. Also stored then are a plurality of layout and connector objects comprising controls for rendering the different types of elements of the plurality of user interfaces, which can be downloaded as needed. The arrangement is thus ready to generate any and all of the defined interfaces. To generate one of the defined interfaces, the arrangement engages in processing (rendering, etc.) of that interface's description documents as recited above.

The arrangement facilitates creation of user interfaces for new applications, creation of new user interfaces for applications, and modification of existing user interfaces. For example, to create an existing user interface for a new application, the existing layout engine of the user interface may be reused, the existing connector engine must be supplemented with connector objects for any new interaction elements introduced by the new application, and the interaction description document must be rewritten. To create a new user interface for an existing application, the layout engine of the existing user interface must be supplemented with layout objects for any new definition elements introduced by the new interface, and the interface description document must be rewritten. To modify an existing user interface of an application, the existing connector and layout engines may be reused, and only the interface description document must be rewritten. And to create a user interface for a new access device, a new interface description document and new layout objects for the new device must be created. (The interactor may also have to be ported to a new operating system.) Also, a plurality of user interfaces can share description documents and objects, thus simplifying the effort of writing additional user interfaces.

While the invention has been characterized in terms of method, it also encompasses apparatus that performs the method. The apparatus preferably includes an effector—any entity that effects the corresponding step, unlike a means—for each step. The invention further encompasses any computer-readable medium containing instructions which, when executed in a computer, cause the computer to perform the method steps.

These and other features and advantages of the invention will become more apparent from a consideration of an illustrative embodiment of the invention taken together with the drawing.

BRIEF DESCRIPTION OF THE DRAWING

FIG. 4 is a pseudo-code representation of an illustrative XML interface description document of a system of FIGS. 1 or 2;

FIG. 5 is a pseudo-code representation of an illustrative XML feature description document of a system of FIGS. 1 or 2;

DETAILED DESCRIPTION

Figure 1:
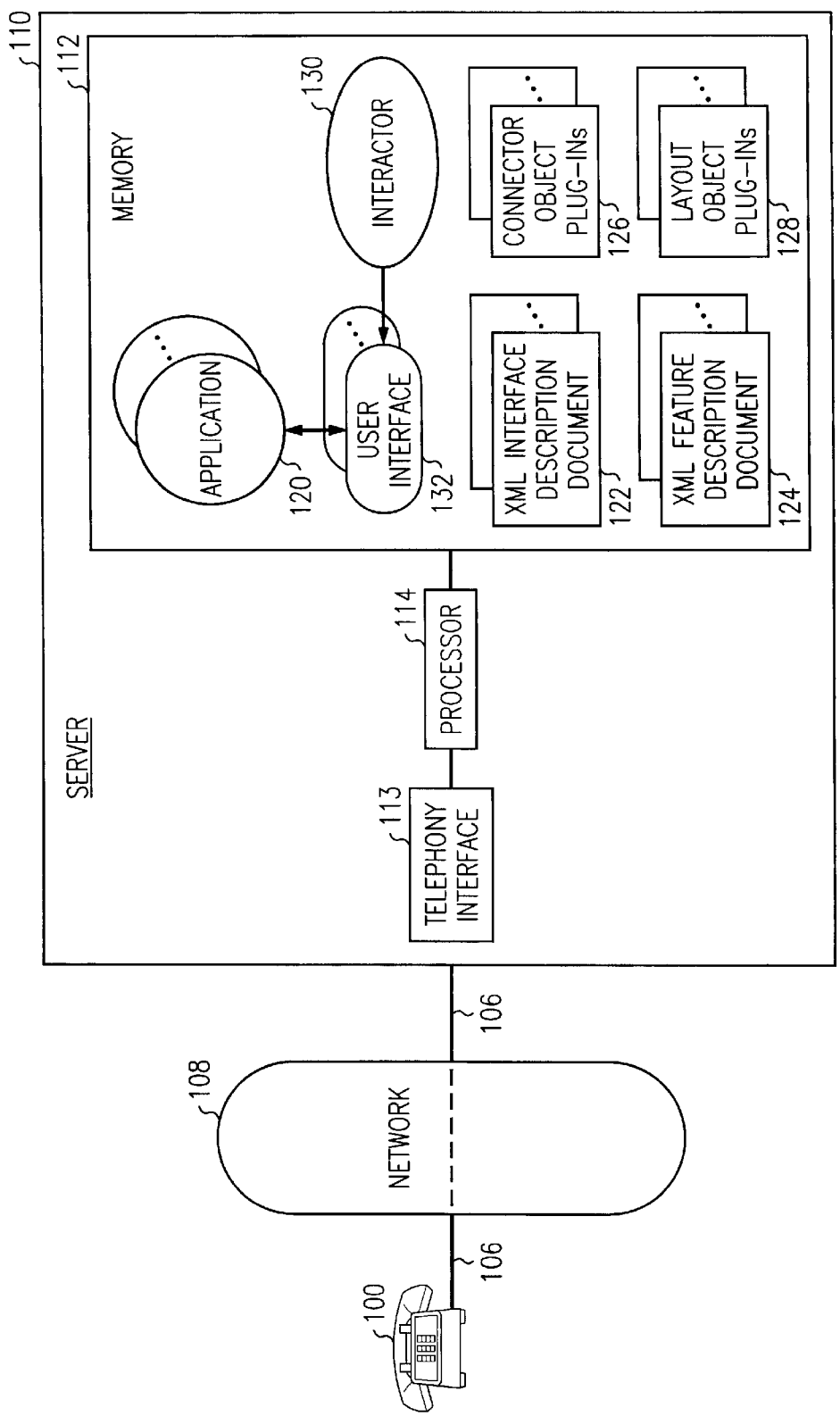
FIG. 1 is a block diagram of a communications system that includes a first illustrative embodiment of the invention.

FIG. 1 shows a communications system that implements a first illustrative example of the invention. The system is a telephony system, comprising one or more telephony-type user terminals, such as telephones 100, interconnected by a telephony network 108 to one or more servers 110. Connections 106 between network 108 and telephones 100 and servers 110 are illustratively telephone lines or trunks. Alternatively, telephone 100 may be either a Web phone or a telephone with a data interface and network 108 may be a data network such as the Internet, and together they may implement a Voice over Internet Protocol (VoIP) system. Each server 110 is a stored-program-controlled machine, such as a computer, a messaging system, or a telecommunications switching system, comprising a telephony interface 113, such as one or more telephony line or trunk port circuits, a processor 114 connected to telephony interface 113 for controlling its operation, and a memory 112 storing data and one or more programs for use and execution by processor 114.

As described so far, the system of FIG. 1 is conventional. According to the invention, however, memory 112 of server 110 includes an interactor program 130, feature- and interface-description documents 124 and 122, and connector and layout plug-ins 126 and 128, which implement one or more user interfaces 132, including telephony user interfaces (TUIs), between users and one or more applications 120 on server 110. Users access applications 120 via telephones 100. Applications 120 may support several TUIs. Each TUI implements a set of menus each having a set of commands. The commands interact with a set of features of application 120. TUI users navigate the menus when they enter menu choices.

Figure 2:
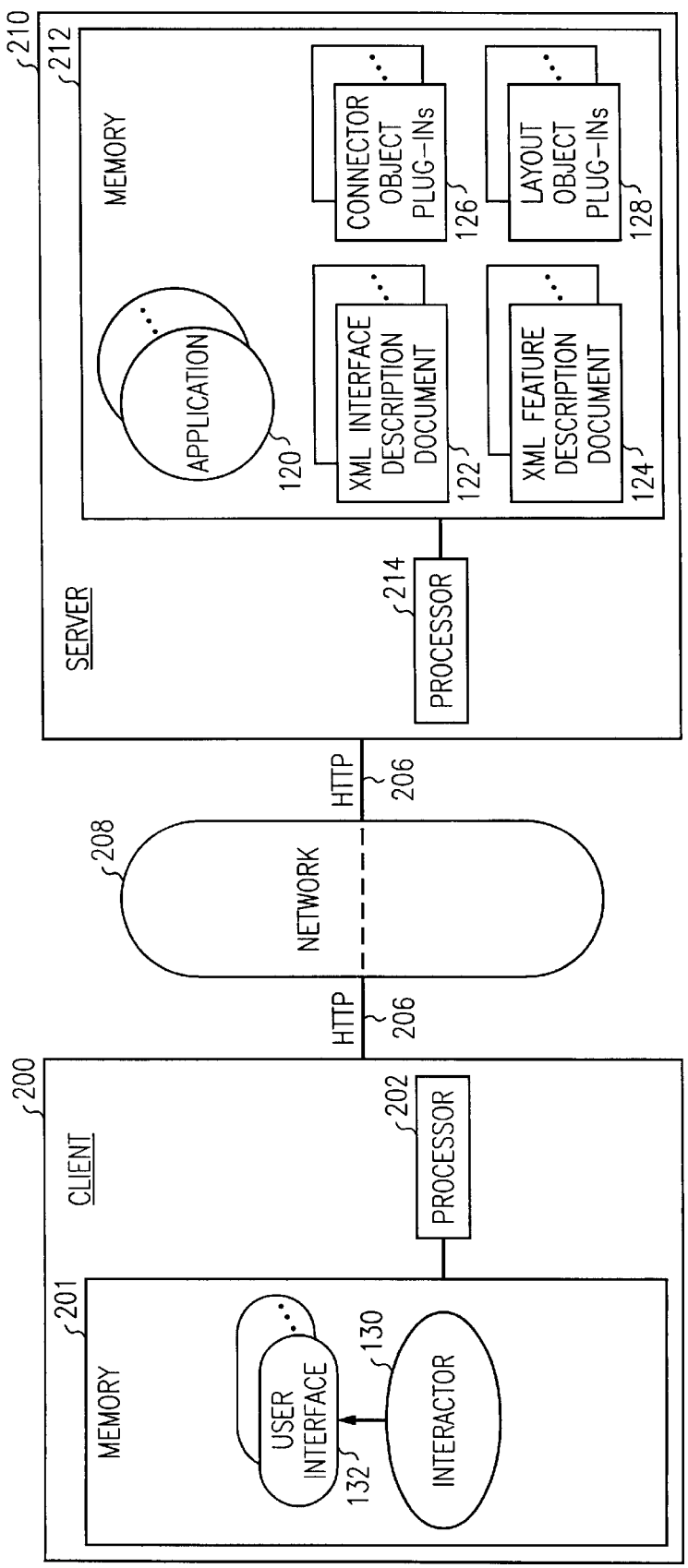
FIG. 2 is a block diagram of a communications system that includes a second illustrative embodiment of the invention.

FIG. 2 shows a communications system that implements a second illustrative example of the invention. The system comprises one or more servers 210 and one or more clients 200 interconnected by a communications network 208. Network 208 is illustratively the Internet or the World Wide Web, and communications between clients 200 and server 210 are effected via hypertext transfer protocol (HTTP) transfers 206 through network 208. Clients 200 are stored-program-controlled machines, such as personal computers, workstations, personal digital assistants, or intelligent telephones, each comprising a processor 202 and a memory 201 storing data for use and programs for execution by processor 202. These programs may include a Web browser. Each server 210 is also a stored-program-controlled machine, such as a computer, a messaging system, a telecommunications switching system, or a Web server, comprising a processor 214 and a memory 212 storing data for use and programs for execution by processor 214.

As described so far, the system of FIG. 2 is conventional. According to the invention, however, each client 200 includes an interactor program 130, and server 210 includes feature- and interface-description documents 124 and 122 and connector and layout plug-ins 126 and 128, which implement one or more user interfaces 132, including graphical user interfaces (GUIs), between users and one or more applications 120 on servers 210. Users access applications 120 via clients 200. Documents 122 and 124 and plug-ins 126 and 128 are downloaded to interactor 130 of client 200 as needed.

Interactor 130 and description documents 122 and 124 in FIGS. 1 and 2 are illustratively implemented in XML. XML was already mentioned above. Like its parent SGML, XML is a meta-language. It is a set of rules that allow a developer to write documents as a set of parts, specifying both what the parts are and how they relate to each other. The parts, or elements, are depicted by using tags which look like HTML tags (text inside angle brackets). Unlike HTML, however, XML allows the developer to define his or her own tags. A document that adheres to this XML syntax is referred to as "well-formed". One creates a set of tags and rules for a document by specifying them in a Document Type Definition (DTD). The DTD describes the rules for well-formed and/or valid documents in the target grammar. The DTD declares and defines the tag set, the associated set of attributes, and the hierarchical (nesting) rules of the tags. An XML document begins with a header that contains or references its DTD. A document that adheres to its DTD is referred to as "valid". A DTD specifies what the document's parts are and what their relationships are, but not how to present (e.g., display) them. If this information is not embedded in the program that uses the XML documents, this information is specified to a browser in a style sheet. Style sheets are a technology that lets designers specify design elements for their Web pages. They complement structured documents (e.g., HTML and XML applications), providing stylistic (e.g., layout) information for the marked-up text. Style sheets use Extensible Style Language (XSL) to describe display information to browsers. Style sheets (XSL documents) are well-formed XML documents. Further information on XML may be found in, for example, E. R. Harold, *XML Extensible Markup Language*, IDG Books Worldwide, Inc. (1997) ISBN 0-7645-3199-9.

Web programmers create and build XML documents, navigate their structure, and add, modify, or delete elements and content by means of a Document Object Model (DOM). A DOM is an instance of an object model that is used in a browser. A DOM is a language- and platform-neutral interface that allows programs and scripts to dynamically access and update the content, structure, and style of documents. DOM provides a standard set of objects and their methods for representing HTML and XML documents, a standard model of how these objects can be combined, and a standard application program interface (API) for accessing and manipulating them. Almost anything found in an HTML or XML document can be accessed by using DOM. DOM is an object model in the traditional object-oriented design sense: documents are modeled using objects, and the model encompasses not only the structure of a document but also the behavior of a document and the objects of which it is composed. Further information on DOM may be found in, for example, W3C, *Level 1 Document Object Model Specification*, Version 1.0 (W3C Working Draft Jul. 20, 1998), W3C organization's document no. WD-DOM-19980720.

According to the invention, XML or another descriptive language and JavaScript or another interpretive language are used to define a user interface 132 in terms of an object model. The descriptive language is used to define the appearance of the user interface, while the interpretive language is used to define the behavior of the user interface. Description documents 122 and 124 define the definition elements and the interaction elements of one or more user interfaces 132 to one or more applications 120. XML interface description documents 122 define user-interface-dependent definition elements (objects) of user interfaces 132, like menus, prompts, and commands of a TUI, or frames, buttons, text, text boxes, etc., of a GUI. These elements interact with the user of the user interface. An illustrative XML interface description document 122 defining the main TUI menu of a representative messaging system is shown in FIG. 4. It shows a root element (DOCTYPE) called "application" with attribute "name" whose value is "MsgCore". The "objects URL" is a reference to connector objects 126 for this application 120, so interactor 130 can find them. A second level element called "menu" with attribute "name" represents a location in user interface 132. Each location gets its own value for "name", e.g., "imain", "get messages", "create messages", etc. Interface locations are referenced in interface description documents by using "URL#menu_name". Interactor 130 starts at the description document element whose name is "main". Each description document element and its subtree will be interpreted and rendered by layout objects 128. There are also elements called "commands" for each command in the interface. Value "JavaScript" of the attribute "LANGUAGE" of the element called "SCRIPT" tells layout objects 128 to pass this element to a JavaScript parser/interpreter. XML feature description documents 124 define user-interface-independent interaction elements (objects) of user interfaces 132, like features, and their options and values, of application(s) 120 that user interfaces 132 interface to. An illustrative XML feature description document 124 defining the greetings feature of the representative messaging system is shown in FIG. 5. It shows a root element (DOCTYPE) called "application" with attribute "name" whose attribute value is "MsgCore." But note that this root element's DTD is different from that of the root element of FIG. 4. Since the two types of documents 122 and 124 describe different objects, they have different formats and DTDs. A second level element called "feature" has attribute "name" whose value is "greetings", and an element called "option" has two attributes "name" and "values". Each feature description document element and its subtree will be interpreted and rendered by layout objects 128. "Values" gives the range of acceptable values for this option. A scripting language (e.g., JavaScript, JScript, or VBScript) is used to operate on those objects. (Henceforth, the use of JavaScript will be assumed, because it acts on arbitrary objects [does not distinguish between data and programs] and is event-oriented.) Connector objects 126 reflect their own interface methods into the object model. This makes them accessible to JavaScript. And a program, referred to herein as interactor 130, implements user interfaces 132 from documents 122 and 124.

Figure 3:
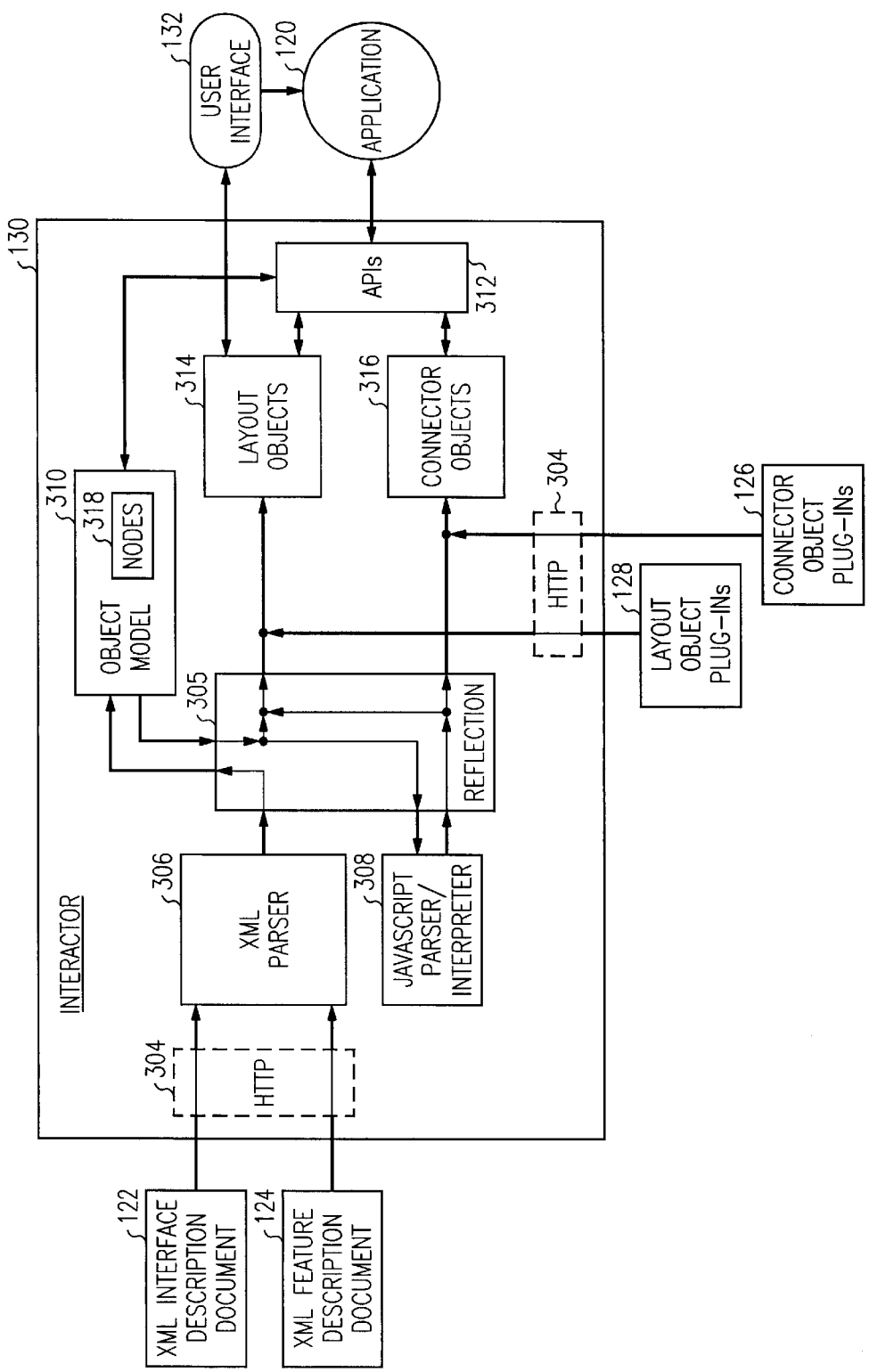
FIG. 3 is a block diagram of an interactor of the communications systems of FIGS. 1 and 2.

Interactor 130 is shown in FIG. 3. It reflects the contents of documents 122 and 124 into object model 310 to create an instance thereof in executable form. Interactor 130 then executes that instance by using downloadable layout object plug-ins 128 and connector object plug-ins 126 to create a corresponding user interface 132. A "home page" document 122 tells interactor 130 what "personality"(e.g., TUI or GUI) it has, and interactor 130 uses URLs and/or XML tags to download corresponding plug-ins 126 and 128 as needed. Implementation of plug-ins 126 and 128 depends on the execution environment, e.g., COM objects in Microsoft Windows operating system environments, shared objects in UNIX operating system environments. Objects in object model 310 make themselves available to JavaScript scripts that are embedded in documents 122 and 124 by registering their interface methods in object model 310. Connector object plug-ins 126 are application-specific but access-device-neutral. They provide connections to applications 120: they "know" how to communicate application-specific options and changes back to applications 120 via whatever application program interface (API) or other interface those applications 120 support. Connector objects register (reflect) their own interface methods in object model 310 to make themselves available to JavaScript. Connector object plug-ins 126 are expressed in executable code. Layout object plug-ins 128 provide application-neutral but access-device-specific concepts like playing prompts, accepting Touch-Tones, generating windows, and any other specific user-interaction mechanisms. Layout object plug-ins 128 "know" how to render (generate) these elements of the user interface. They are executables that plug into object model 310 and interpret the interface definition provided by a menu description document 122, matching the elements of the interface definition where user interaction occurs.

Figure 11:
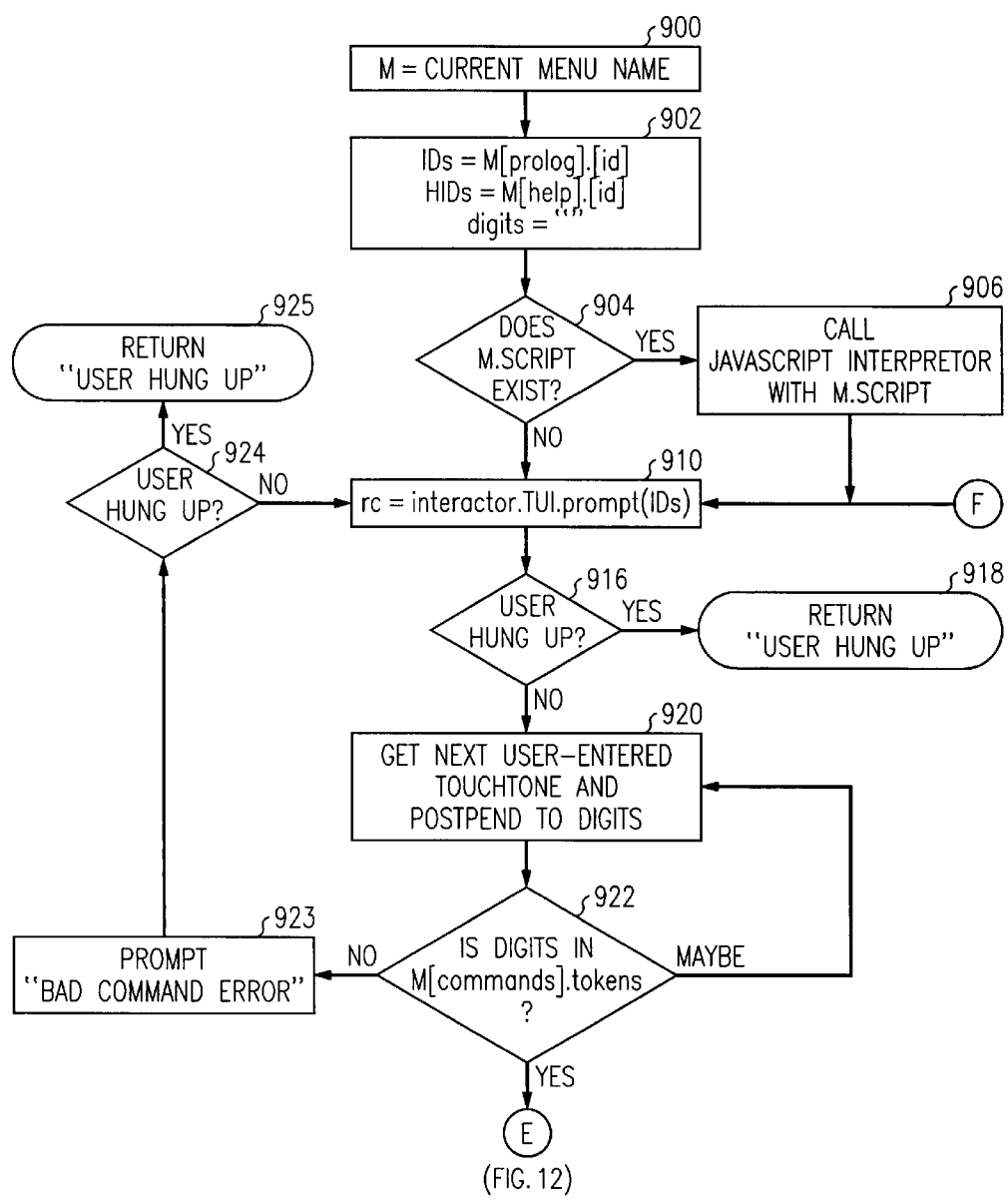
FIGS. 11–12 are a flow chart, expressed in pseudo-Java Script, of a representative telephony user interface layout object.
Figure 15:
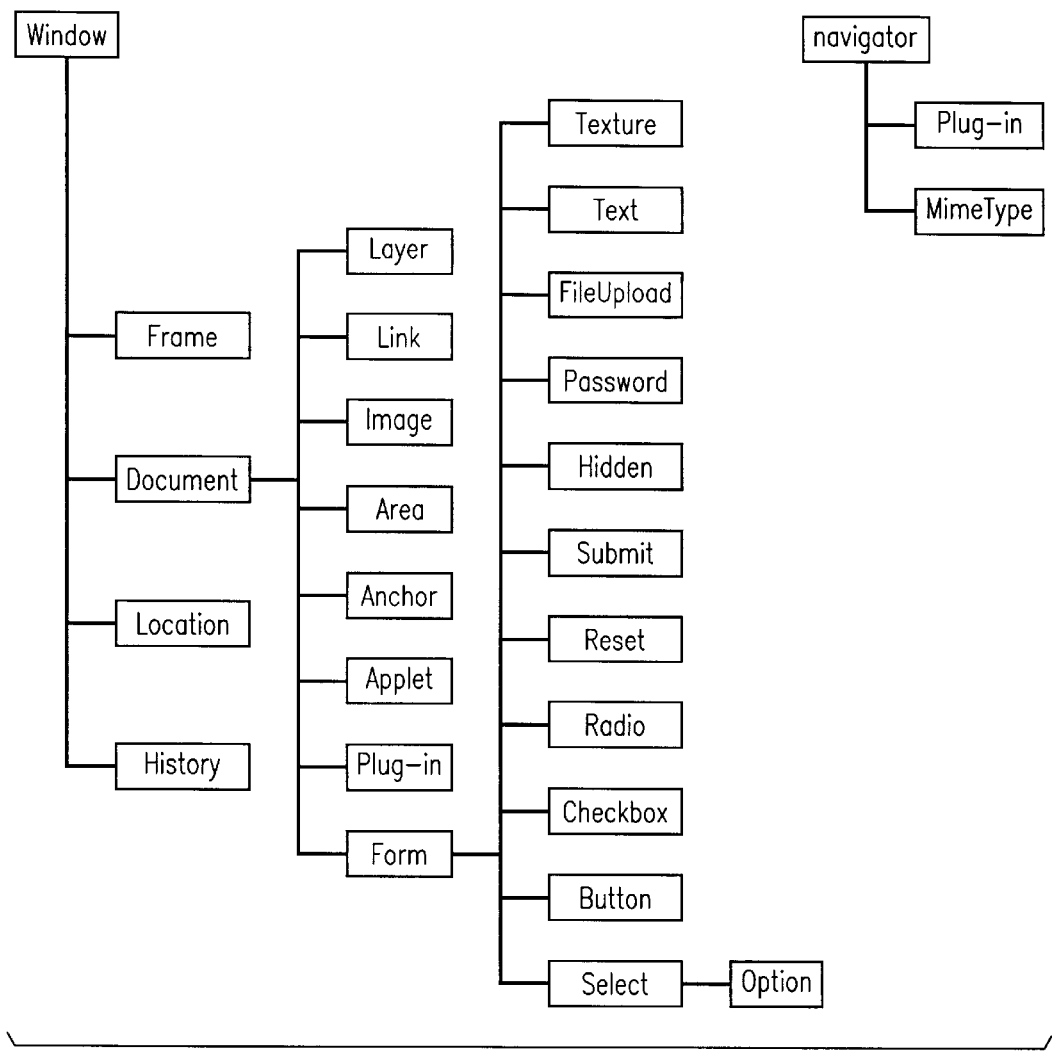
FIG. 15 is a block diagram of a document object model of the browser of FIG. 14.

In a number of ways, interactor 130 resembles a conventional Web browser, shown in FIG. 11. A browser uses a uniform resource locator (URL; an Internet address) to obtain a document over a data network (e.g., the Internet) via the hypertext transfer protocol (HTTP). The received document, expressed in hypertext mark-up language (HTML) with JavaScript inserts, is parsed by an HTML parser and a JavaScript parser into HTML and JavaScript elements. The parsers transform the hierarchy of HTML tags in the source document into a form that the underlying layout engine requires (the target form). The browser reflects the information into an object hierarchy called the document object model (DOM) to create instances of DOM class objects that correspond to the elements. The DOM may comprise globally available objects as well as user-defined objects (e.g., plug-ins). A portion of an illustrative browser's DOM showing objects and their hierarchies is shown in FIG. 15. Instantiated objects are given to a layout manager, which uses them to implement what is displayed on the screen, including input elements like buttons, radio buttons, and text entry. The layout manager uses plug-ins to render (generate) display information that it does not have built-in, loading the plug-ins automatically from a repository on the Web.

Figure 16:
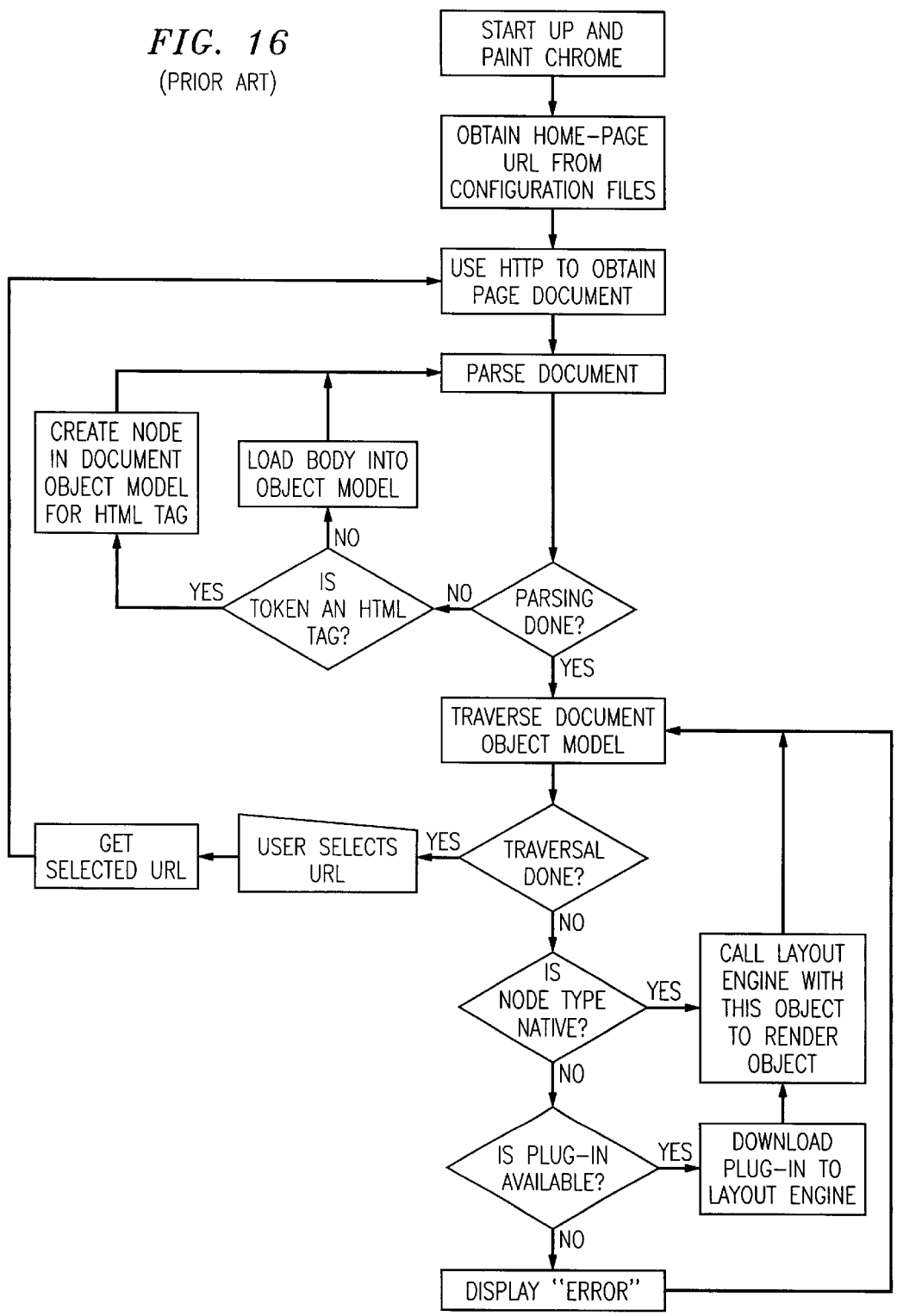
FIG. 16 is a flow chart of conventional operations of the browser of FIG. 14.

The operation of a conventional browser is illustrated in FIG. 16. The browser implements a GUI. Upon its invocation, the browser starts up and paints the "chrome" (the generic pieces of the image around the edge of the screen that are common to all displayed pages) on the display screen. The browser then obtains the URL of its homepage from its configuration files and uses HTTP to obtain the homepage document from a server. The browser parses the obtained document element-by-element (token-by-token) and reflects each token into the DOM. Reflection is effected as follows. The browser checks if the token is an HTML tag. If so, the browser creates a node in the DOM for the HTML tag, and then returns to parse another token from the document. The node includes various attributes, including one that indicates the DOM type of the tag. If the token is not an HTML tag (e.g., JavaScript code), the browser loads the body of the tag into the object model, and then returns to parse another token from the document.

When it has completed parsing the document and reflecting its elements into the DOM, the browser traverses the object model that it has created node-by-node, and checks if the node is of a type that is "native" to the browser, i.e., whether it is of a type that the browser knows how to render. If the node is of a native type, the browser calls the layout engine with this object, and the layout engine renders the object (displays it on the display screen). The browser then returns to traversing the object model. If the node is not of a native type, the browser contacts a repository of plug-ins (e.g., a server) to determine if a corresponding plug-in is available. If not, the browser displays an error indication, to traversing the object model.

When the browser finishes traversing the object model, it waits for the user to select an active link in the displayed page, or to select the HOME or the BACK button in the chrome. Each such action selects a URL, and the browser obtains the selected URL. The browser then uses HTTP to obtain the page addressed by the URL, as it did with the homepage, and the process repeats.

According to the invention, interactor 130 takes browser technology and applies it to a variety of user interfaces, including telephony user interfaces. Both the conventional browser and interactor 130 take a document expressed in mark-up language, parse it, and reflect its elements into an object model that is available to embedded scripts. And both have a layout engine that is used to display document content. In many other ways, however, interactor 130 differs from a browser. While browsers are access-device dependent, interactor 130 is access-device neutral, or independent. While browsers are designed primarily for reading information, interactor 130 is designed for two-way interaction (communication) with arbitrary applications 120. While browsers reflect documents into a predefined document object model (DOM), the interactor's object model 310 is not predefined but rather is specified by description documents 122 and 124 and plug-ins 126 and 128. And while a browser is visible to the user and has an appearance that includes pull-down menus, a history window, etc., interactor 130 is invisible to the user; its purpose is to merely implement the user interface.

Figure 6:
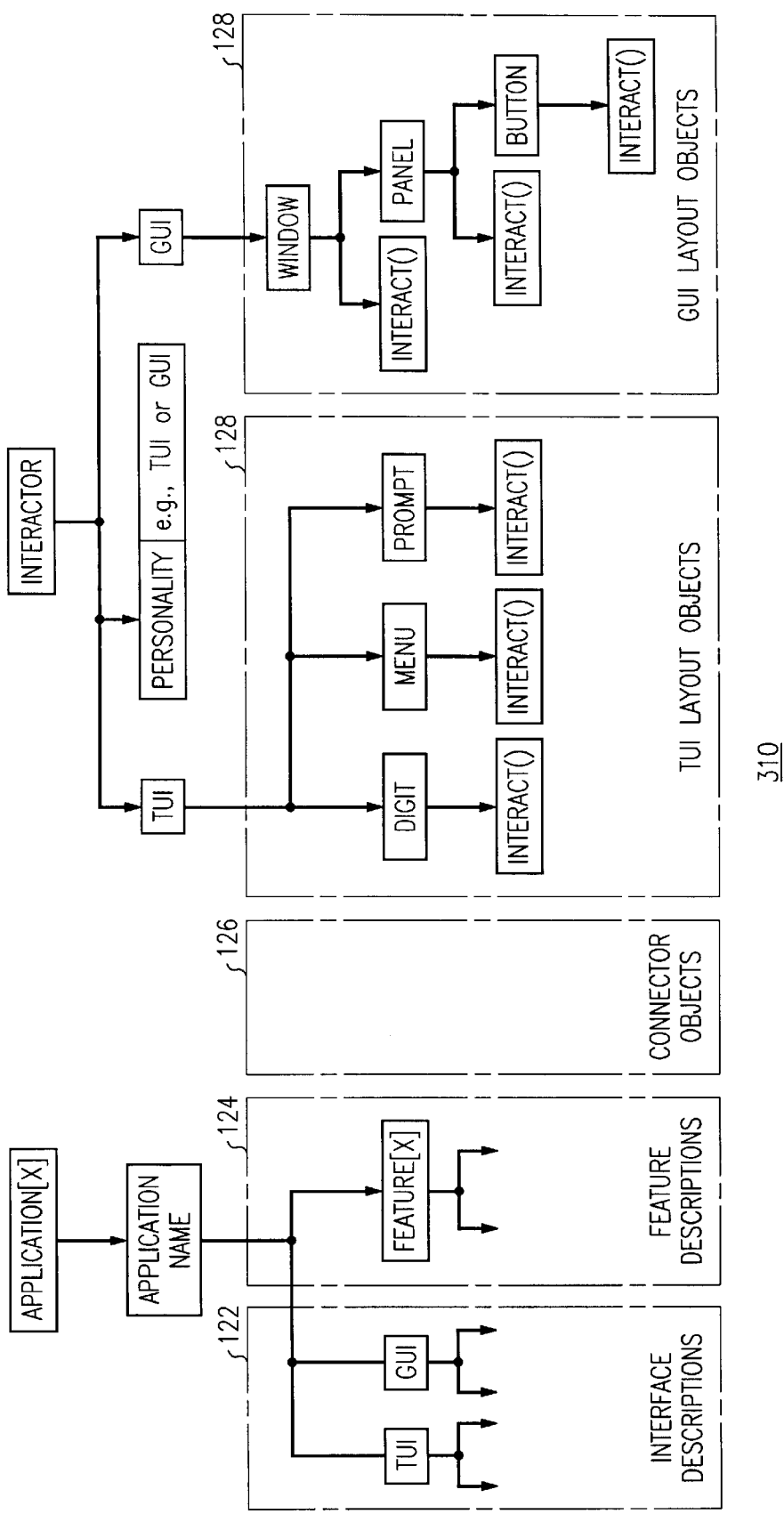
FIG. 6 is a block diagram of an object model of the interactor of FIG. 3.

Interactor 130 is shown in FIG. 3. At its creation, in its generic form, interactor 130 consists of executables (like a browser), shared libraries that define a software developers' kit (SDK, a/k/a software development kit; a set of tools to help programmers write new applications, such as a visual screen builder, an editor, a compiler, a linker, and tools for creating menus, icons, dialog boxes, etc., and for interfacing the application with an operating system), and documentation that defines the object model (e.g., a tutorial describing the object model, manual pages, etc.). A generic object model 310 for user interfaces is shown in FIG. 6. A developer of a particular user interface 132 uses the generic form of object model 310 to write description documents 122 and 124 and plug-ins 126 and 128. Interactor 130 maintains object model 310, loading pieces into it from documents 122 and 124 as needed, and passes control to the appropriate objects 314 downloaded from plug-ins 128 by passing to them a pointer to the present point of execution of user interface 132. Interactor 130 uses a URL to obtain menu description documents 122 and feature description documents 124 via an inter-process communications arrangement of computer 110 if interactor 130 and the documents are co-located on a computer (e.g., as in FIG. 1), or via HTTP 206 if interactor 130 and the documents are located on different computers 200 and 210 (e.g., as in FIG. 2). In the latter case, an HTTP communications module 304 of interactor 130 terminates the HTTP protocol. The received documents 122 and 124, expressed in XML interspersed with JavaScript code, are parsed by an XML parser 306 into XML elements (tokens) and JavaScript code, and these elements are reflected by a reflection process 305 into object model 310. As in browsers where reflection is commonly used, reflection process 305 represents the elements (objects) in a form in which they become available for other objects to manipulate. A general view of object model 310 that is presented by the SDK of interactor 130 to JavaScript is shown in FIG. 6. Reflection process 305 uses object model 310 to create nodes (instance objects) 318 that correspond to the tokens that are parsed from documents 122 and 124.

The reflection of the XML elements of documents 122 and 124 leads to the downloading of a set of corresponding objects from object plug-ins. Downloaded layout objects 314 match the elements of the interface description document 122 where user interaction occurs. Layout objects 314 are executable controls that together form a layout engine: their job is to implement elements of the user interface (what is displayed on the screen in the case of GUI and what is heard on the telephone in the case of a TUI) and to interact therethrough with a user. Layout objects 314 are plug-ins 128 conforming to a generalized layout interface shown in FIG. 13. A TUI interface description document 122 only needs interaction for a menu element. This means that TUI layout objects only need to include the menu interaction method shown in FIGS. 11–12. The interaction method knows the details of the interface description DTD. For instance, it looks for dialog elements so that it can issue dialog prompts. It knows how to get digit input from the interface user and how to match that against token elements. When it finds a match, it navigates the sub-tree under the token element, passing JavaScript elements to the JavaScript parser/interpreter 308. When it navigates to a next element, it passes the value of the sub-menu element back as the return value of the interaction method.

The SDK of interactor 130 allows layout objects 314 to initialize and de-initialize, to register their interaction methods in object model 310, to traverse (access and manipulate) object model 310, to call a JavaScript parser/interpreter 308, etc. The set of layout objects 314 form a layout engine for an interface 132. The JavaScript nodes are in turn parsed by a JavaScript parser/interpreter 308 into JavaScript elements (tokens). The reflection of the JavaScript elements of menu description documents 122 leads to the downloading of a set of corresponding layout objects 314 from layout object plug-ins 128. The features of the underlying application 120 that is being interfaced to are reflected into object model 310 of interactor 130 via feature description documents 124. Their feature-description objects (interaction elements) give the layout-description objects (definition elements, from interface description documents 122) the ability to discover and validate parameters. The reflection of the JavaScript elements of feature description documents 124 leads to the downloading of a set of corresponding connector objects 316 from connector object plug-ins 126. Connector objects 316 are also executable controls; their job is to provide a programmatic communication path to application 120. Connector objects 316 provide a wrapper on the application's APIs 312. This allows layout objects 314 and application 120 to communicate. Object model 310 thus serves as a communications space—a "whiteboard"—for communicating between documents 122 and 124, layout objects 314, and connector objects 316. The SDK of interactor 130 allows connector objects 316 to initialize and de-initialize, to register methods in object model 310, and to access HTTP 206 and/or the interprocess communications mechanism.

Figure 7:
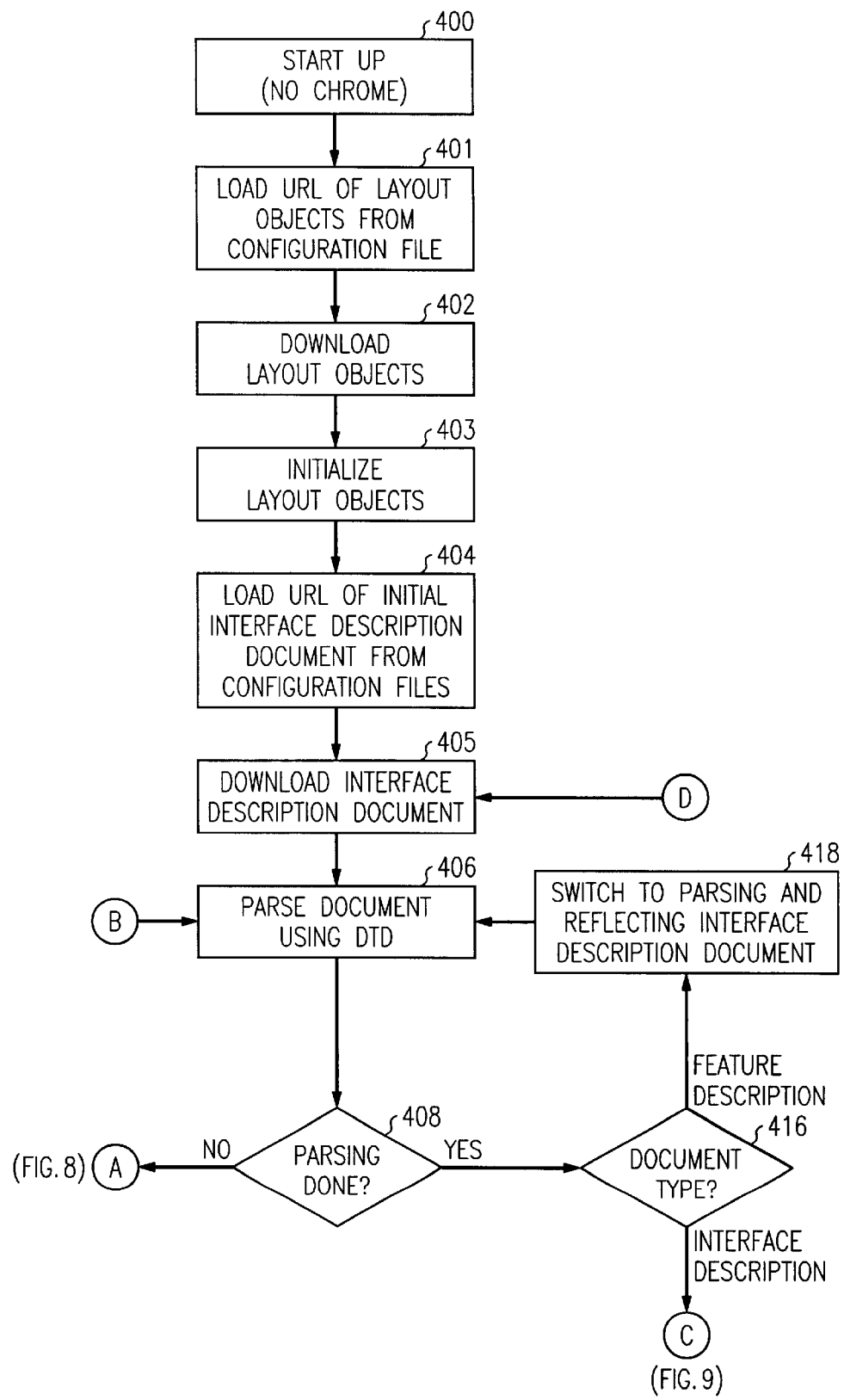
FIGS. 7–9 are a flow chart of reflection operations of the interactor of FIG. 3.
Figure 8:
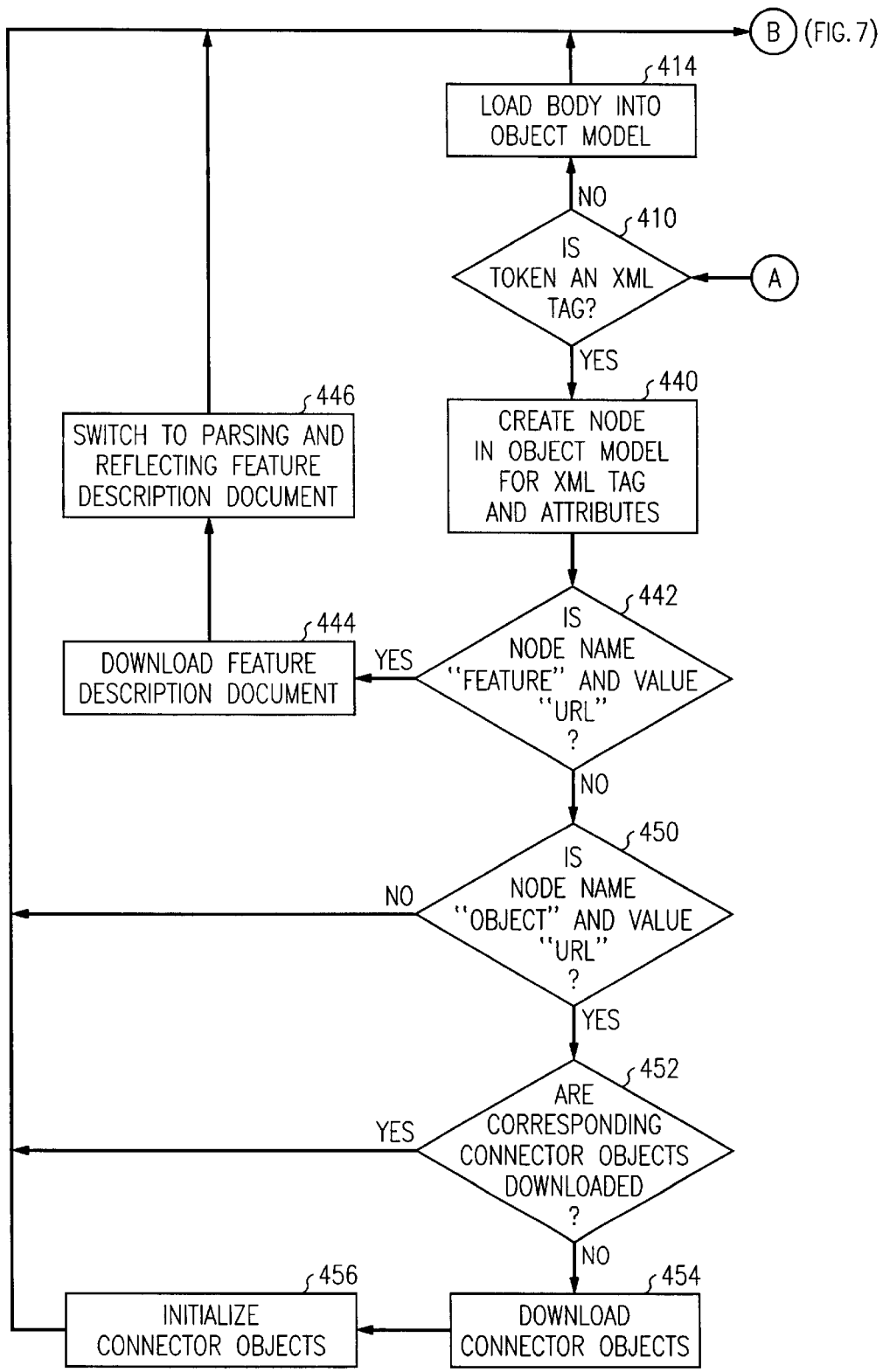
Figure 9:
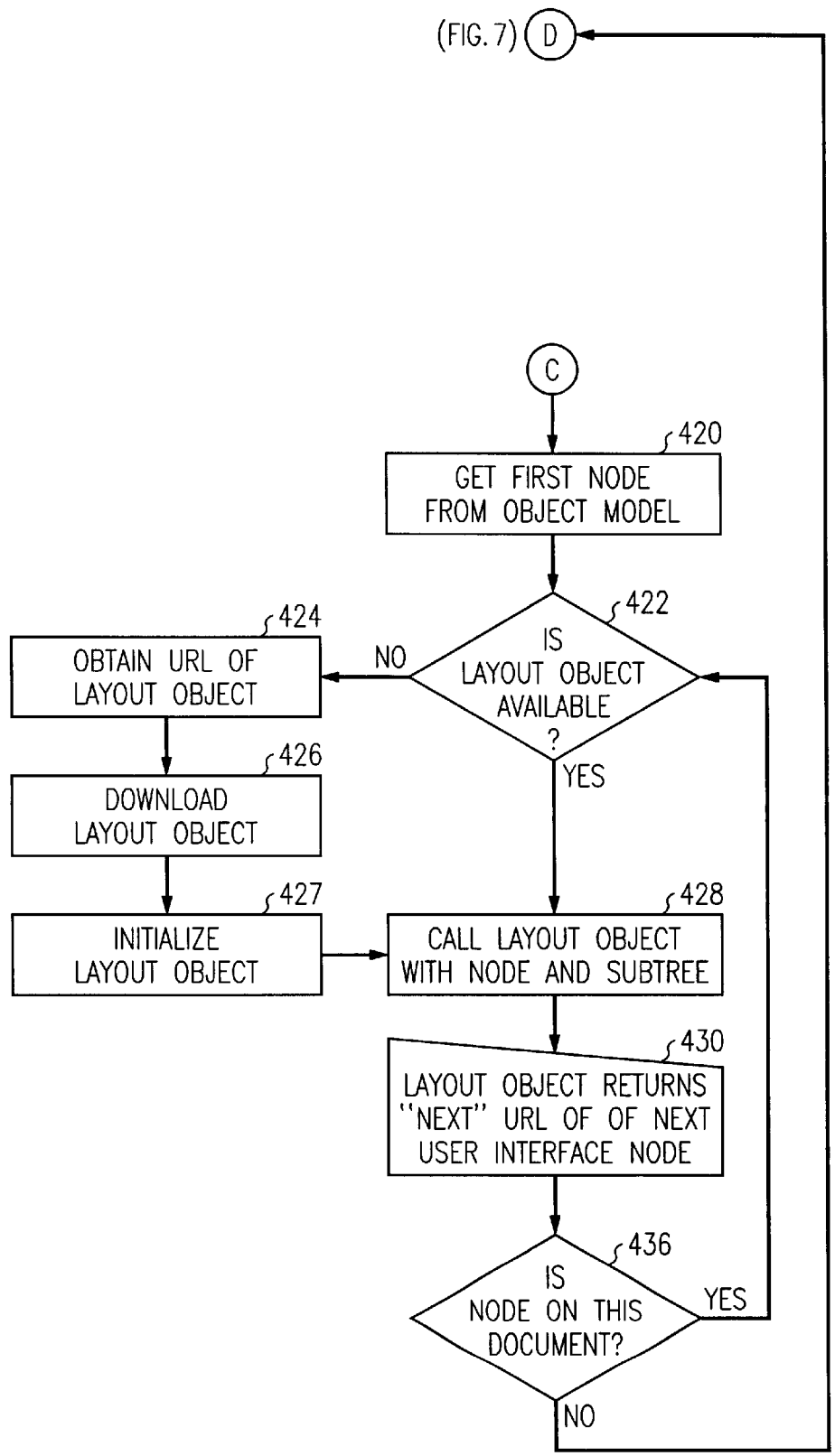
Figure 10:
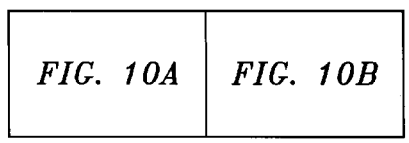
FIGS. 10A and 10B are a block diagram of the reflection of the documents of FIGS. 4 and 5 in the object model of FIG. 6.

The operation of interactor 130 is illustrated in FIGS. 7–9. Upon its invocation, interactor 130 starts up, at step 400, and obtains from its configuration files the URL of layout object plug-ins 128 that it is to use, at step 401. It then uses the URL to download those plug-ins 128 into layout objects 314, at step 402, and initializes them, at step 403. During initialization, layout objects 314 register their interaction methods in object model 310. Interactor 130 then obtains the URL of starting user interface description document 122 expressed in XML and JavaScript from its configuration files, at step 402. Interactor 130 then uses HTTP 206 or an interprocess communications protocol to download the starting document 122 from a server 110 or 210, at step 404. Interactor 130 then uses XML parser 306 to parse the obtained document element-by-element (token-by-token), at step 406, and reflects each token in object model 310. Reflection is effected as follows. Interactor 130 checks if the token is an XML tag, at step 410. If the token is not an XML tag (e.g., JavaScript code), interactor 130 loads the body of the tag into object model 310 as a node 318, at step 414, and returns to step 406 to parse another token from the document. If the token is an XML tag, as determined at step 410, interactor 130 creates a node (instance object) 318 in object model 310 for the XML tag and its attributes, at step 440. Node 318 includes various attributes that are defined in XML, including ones that indicate the object name and value. Interactor 130 checks if the node name is "feature" and its value is "URL", at step 442. If so, interactor 130 uses the URL to download a feature description document 124, at step 444, and proceeds at step 446 to parse and reflect that document 124 into object model 310, at step 406 et seq. Interactor 130 then returns to step 406 to parse another token from user interface description document 122. If it determines at step 442 that the node's name is not "feature" and/or its value is not "URL", interactor 130 checks at step 450 if the node's name is "object" and its value is "URL". If not, interactor 130 returns to step 406 to parse another token from the document 122 or 124 that it is presently parsing; if so, interactor 130 uses the URL to check whether the corresponding connector object plug-ins 126 have already been downloaded into connector objects 316 of interactor 130, at step 452. If the corresponding connector objects have been downloaded, interactor 130 returns to step 406 to parse another token from the document 122 or 124 that it is presently parsing. If the corresponding connector objects have not been downloaded, interactor 130 uses HTTP 206 or an interprocess communications protocol to download the corresponding connector objects from connector object plug-ins 126, at step 454, and initializes the downloaded plug-ins to form them into connector objects 316, at step 456. As they initialize, connector object plug-ins 126 register their interfaces in object model 310. Interactor 130 then returns to step 406 to parse another token from the document 122 or 124 that it is presently parsing.

Figure 10A:
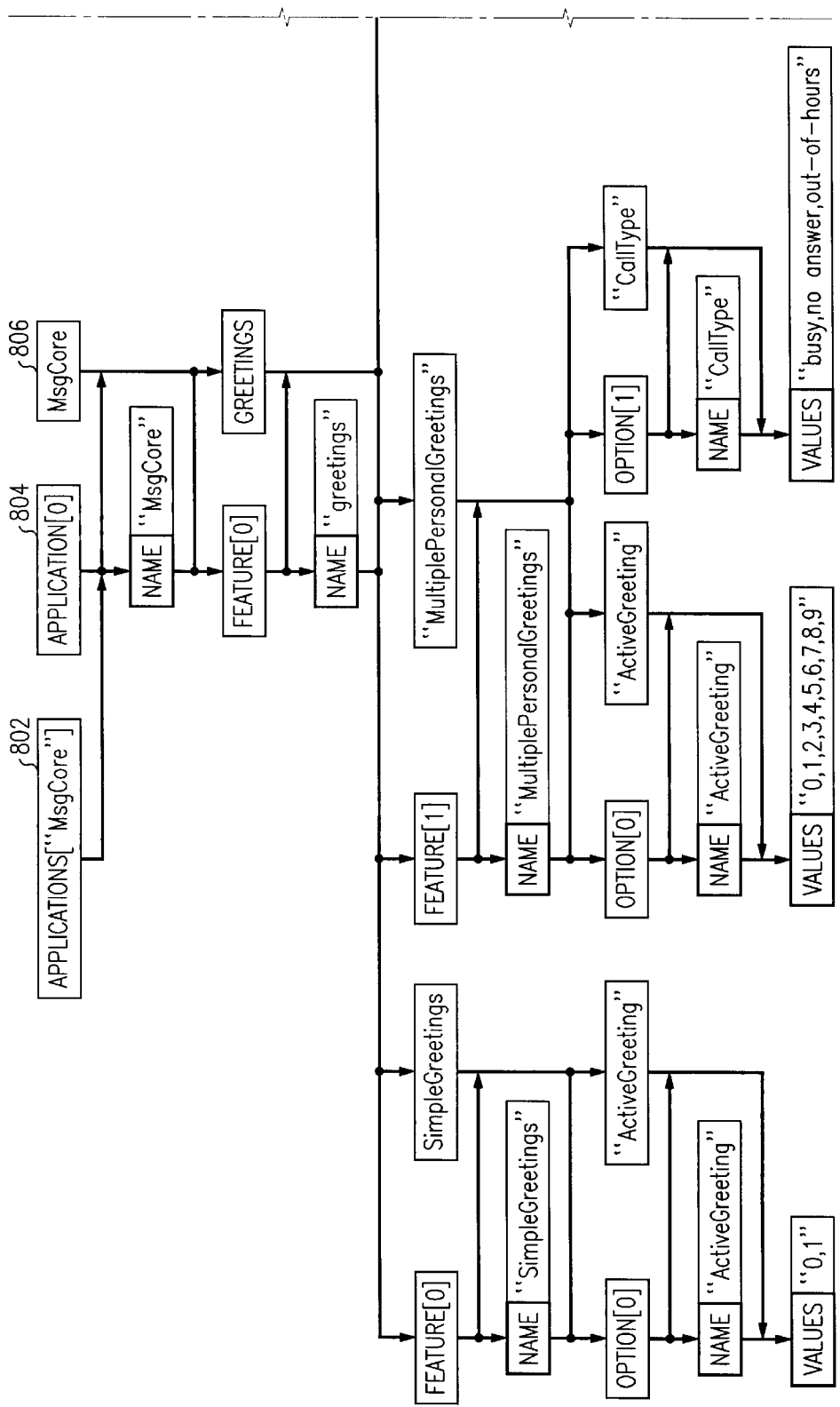
Figure 10B:
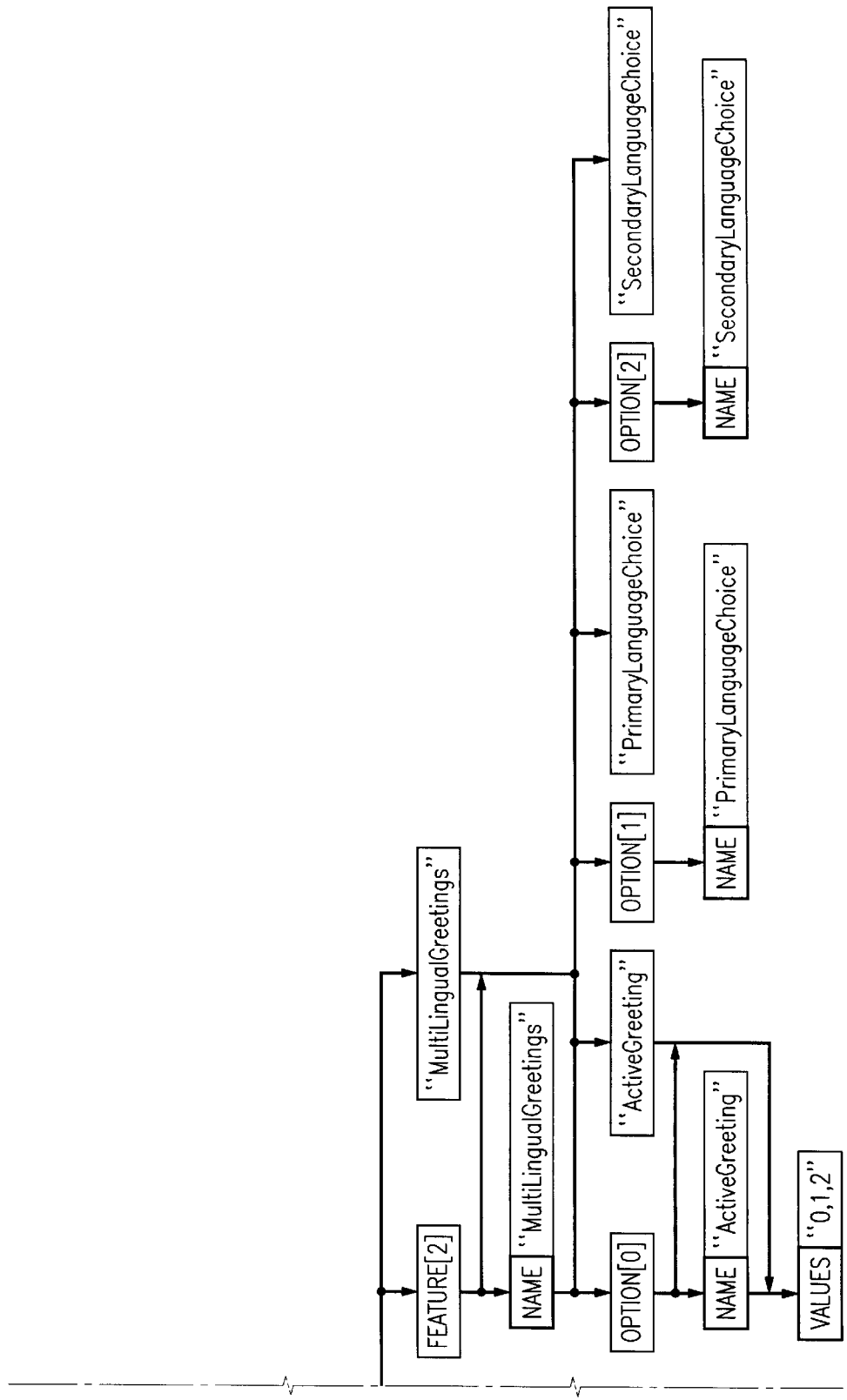

An illustrative reflection, of XML feature description document 124 of FIG. 5 in object model 310 of FIG. 6, is shown in FIGS. 10A–10B. FIGS. 10A–10B are a syntactic parsing of FIG. 5, where the parse tree is represented by the object model of FIG. 6. Each node in the tree is named, and may be referenced by its name. It is worthy to note that the root element "application" in object model 310 appears in three ways: in a collection array "applications" 802 indexed by value of the attribute "name"; in an array 804 named by the element's name; and by a value 806 of the name attribute.

When it has completed parsing the document 122 or 124 and reflecting its elements in object model 310, as determined at step 408, interactor 130 checks, at step 416, whether the completed document is an interface description document 122 or a feature description document 124. If it is a feature description document, interactor 130 switches at step 418 to processing the interface description document 122 whose processing was interrupted at step 446 by processing of the feature description document 124, and returns at step 406. If the completed document is a layout description document 122, interactor 130 gets the first node 318 whose name is "main" from object model 310 that it has created, at step 420, and checks whether it has a layout object 314 for this node, at step 422. If not, interactor 130 obtains a URL of a layout object 314 plug-in 128 for rendering this node 318, at step 424, and downloads that plug-in 128 from a repository 110 or 210, at step 426. The URL can be either configured in interactor 130 or encoded in the XML document itself. Following step 426, or if it determines at step 422 that it already has a layout object 314 for the node 318, interactor 130 invokes the layout object 314, passing a reference to the node 318 and the node's subtree of nodes in object model 310 to that layout object's interaction method, at step 428, thereby causing the layout object 314 to render the node 318 and nodes in its subtree. Having rendered the node and subtree (e.g., generated a display page or played a menu prompt), the layout object 314 may receive user input, to which it responds by executing an action for that input that is defined in object model 310. This may result in calls to connector objects 316 to communicate with application 120. This may in turn result in the layout object 314 returning a request for a rendering of a "next" interface description location, at step 430. In response, interactor 130 finds and gets the next node 318 from object model 310 that it created, at step 434, and determines whether the node is on the document 122 that object model 310 currently represents, at step 420. The node may be a pointer, such as a URL, to another document 122, in which case interactor 130 proceeds to steps 404 et seq. to obtain, reflect, and render the new document 122. If the next node is on the currently represented document 122, interactor 130 proceeds to steps 422 to render the node.

Figure 12:
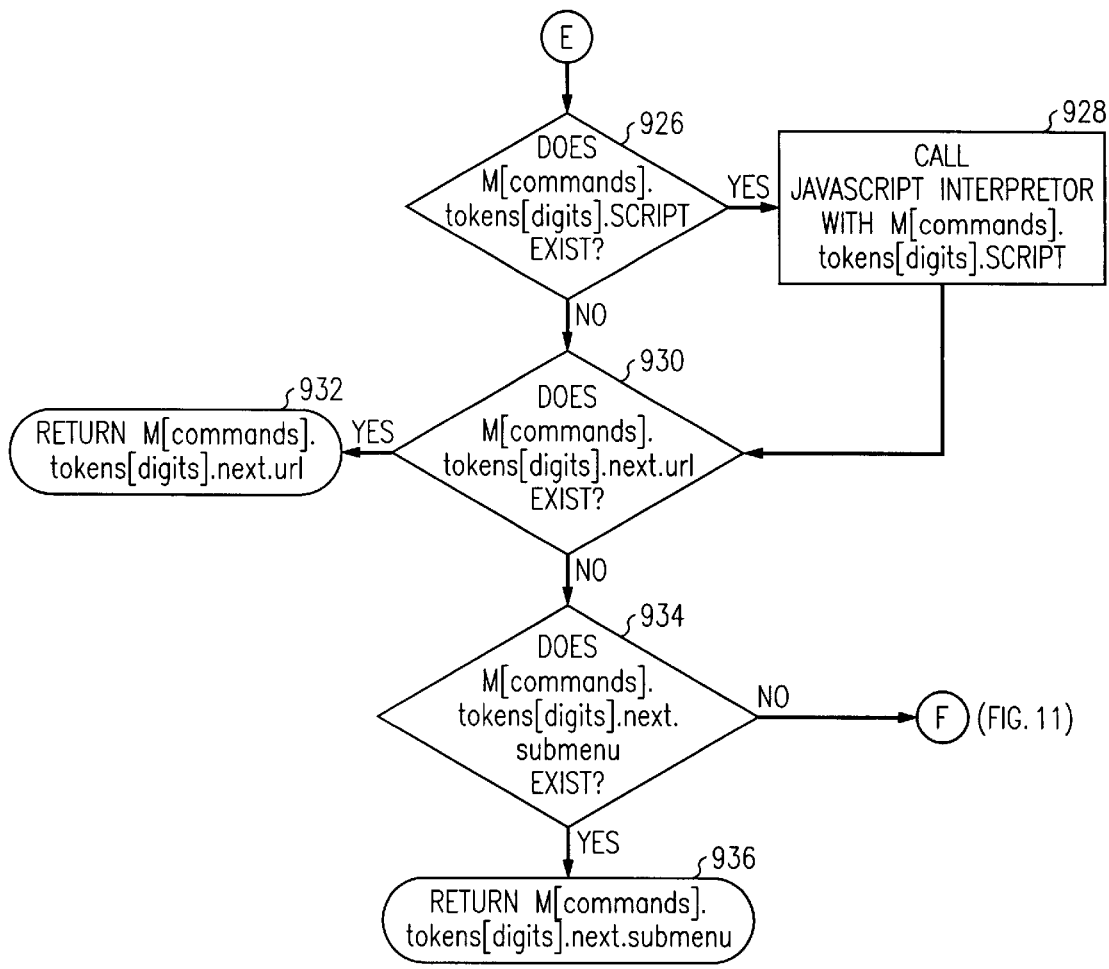
Figures 13, 14:
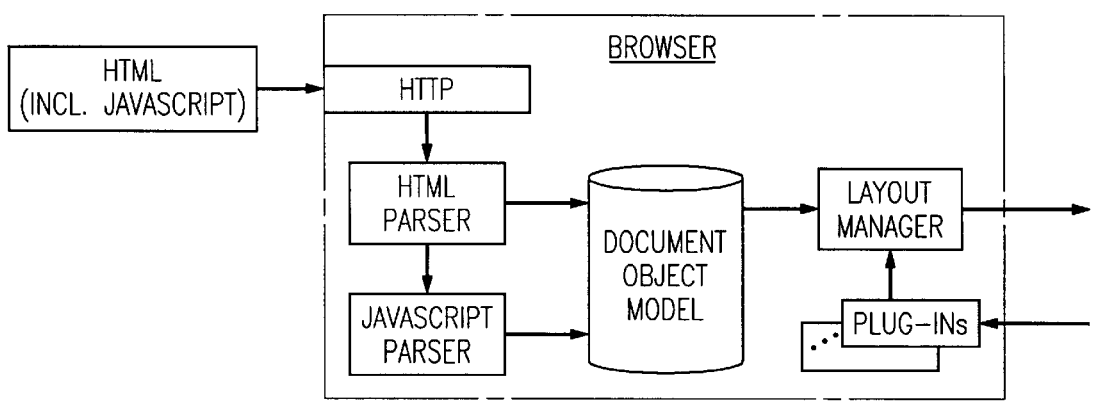
FIG. 13 is a representation of a generalized layout interface between the interactor of FIG. 3 and layout objects.
FIG. 14 is a block diagram of a conventional browser.

As was mentioned previously, layout objects 314 for a TUI follow the functional format of the generic interaction method shown in FIGS. 11–12. The interaction method first establishes a pointer to the current place in the user interface—the current menu, in the case of a TUI—at step 900. It then initializes local variables for the current menu, at step 902. IDs is a pointer to the dialog element for the current menu that the method uses to issue a prompt to the interface user. HIDs is a pointer to a help file for the current menu. DIGITS stores the input entered by the interface user. The method then checks if a JavaScript entry (node 318) exists for the current menu in object model 310, at step 904. If so, the method calls the JavaScript parser/interpreter 308 and passes it the script, at step 906. Following step 906, or if a JavaScript is found to not exist for the current menu at step 904, the method references the prompting method of its layout object 314 and passes it the value of variable IDs that it established at step 902, at step 910. This results in the corresponding prompt being issued to the interface user. If the interface user exits the interface—hangs up the phone, in the case of a TUI—as determined at step 912, the method returns a notification thereof to interactor 130, at step 914. If the user does not exit the menu and instead provides input in response to the prompt, the method collects the input and enters it in the DIGITS variable—collects the next user-entered Touch Tone digit and appends it to the contents of DIGITS, in the case of a TUI—at step 916. The method then compares the contents of DIGITS against the contents of an aggregate array of valid user inputs for the current menu, held by its layout object 314, to see if the collected input is a valid input, at step 918. If the match is indeterminate, the method returns to step 916 to collect further input from the user. If there is no match, indicating an invalid user input, the method causes a "bad command error" notification to be issued to the user, at step 920, prompting the user to try again. If the user exits the interface, as determined at step 922, the method returns a notification thereof to interactor 130, at step 924. If the user does not exit the interface, the method returns to step 910 to prompt the user for new input. Returning to step 918, if the user input is a valid input, the method checks whether there is a corresponding JavaScript entry (node 318) in object model 310, at step 926. If so, the method calls JavaScript parser/interpreter 308 and passes it the script, at step 928. Following step 928, or if it is determined at step 926 that there is no corresponding script, the method checks whether the user's input has a corresponding entry (node 318) in object model 310 that contains a URL, at step 930. If so, the method returns the URL to interactor 130, at step 932. Interactor 130 will use this URL to obtain the next interface description document 122 of the user interface. If it is determined at step 930 that the user input does not have a corresponding entry containing a URL, the method checks whether the user input's corresponding entry (node 318) in object model 310 has any subtending nodes (a subtree), at step 934. A subtree represents a submenu of the current menu in the case of a TUI. If so, the method returns the URL of the subtree to interactor 130, at step 936. Interactor 130 will use this URL to invoke the corresponding layout object 314. If there is no subtree, the method returns to step 910 to collect more input from the interface user.

Each location in the user interface (described by XML interface description document 122) can be referenced either by XML Xpointers or URL/URI plus a section name. An Xpointer consists of a URL and a named element. For example, if the URL for document 122 in FIG. 4 is http://somecompany.com/message.xml, then the main menu can be referenced by http://somecompany.com/message.xml#name(main). Using Xpointers or similar mechanisms, one interface description document can refer to user interface locations in other interface description documents. These documents need not belong to the same application. This mechanism allows user interfaces to be integrated even if the interface description documents were developed independently. Interactor 130 downloads the second application's interface description document 122, feature document 124, and connector objects 126 using their URLs as needed.

Of course, various changes and modifications to the illustrative embodiment described above will be apparent to those skilled in the art. For example, a markup language other than XML and/or a scripting language other than JavaScript may be used to implement the invention. The interactor may run on any desired machine (i.e., a PDA). Connector objects may communicate with the application in any desired manner (i.e., it need not be API-dependent). Formats of documents may be specified in Xschema and XML name spaces instead of DTDs. Or, an addressing notion other than URL or XML tags may be used for user interface locations. Such changes and modifications can be made without departing from the spirit and the scope of the invention and without diminishing its attendant advantages. It is therefore intended that such changes and modifications be covered by the following claims except insofar as limited by the prior art.

What is claimed is:

1. A method of implementing a user interface to an application, comprising:

storing at least one description document conforming to a user interface object model, defining a user interface and comprising one or more definition elements;

storing at least one description document conforming to the user interface object model, defining interaction of the user interface with the application and comprising one or more interaction elements;

storing a plurality of layout objects each comprising a renderer for rendering a different definition element;

storing a,plurality of connector objects each comprising a renderer for rendering a different interaction element;

reflecting the description documents into the object model to generate an instance of the object model defining the user interface and comprising the definition elements and the interaction elements of the description documents;

forming a layout engine for the user interface by downloading from storage layout objects corresponding to definition elements in the instance of the object model;

making interfaces of the downloaded layout objects accessible to the corresponding definition elements;

forming a connector engine for the user interface by downloading from storage connector objects corresponding to interaction elements in the instance of the object model;

making interfaces of the downloaded connector objects accessible to the corresponding interaction elements; and rendering the user interface via the layout engine and the connector engine by passing each element in the instance of the object model to the corresponding downloaded object and executing said object to cause the object to render the element.

2. The method of claim 1 wherein:

the definition elements comprise
one or more elements defining appearance of the user interface, and
one or more elements defining behavior of the user interface toward the user.

3. The method of claim 2 wherein:

the elements defining appearance are expressed in a descriptive language, and
the elements defining behavior are expressed in an interpretive language.

4. The method of claim 2 wherein:

the elements defining appearance are expressed in a markup language, and
the elements defining behavior are expressed in a scripting language.

5. The method of claim 2 wherein:

the elements defining appearance are expressed in XML, and
the elements defining behavior as expressed in JavaScript.

6. The method of claim 1 wherein:

storing at least one description document defining a user interface comprises
storing a plurality of description documents defining a plurality of user interfaces;
storing a,plurality of layout objects comprises
storing a plurality of layout objects each comprising a renderer for rendering a different definition element of a plurality of user interfaces; and
storing a plurality of connector objects comprises
storing a plurality of connector objects each comprising a renderer for rendering a different interaction element of the plurality of user interfaces.

7. The method of claim 6 wherein:

the plurality of user interfaces comprise
user interfaces to a plurality of different applications; and
storing at least one description document defining interaction comprises storing at least one plurality of description documents defining interactions of the plurality of user interfaces with the plurality of applications.

8. The method of claim 7 wherein:

the user interfaces include a telephony user interface and a graphical user interface.

9. The method of claim 6 wherein:

the plurality of user interfaces comprise
a plurality of different user interfaces to a same application; and
storing at least one description document defining a user interface comprises
storing a plurality of description documents defining the plurality of different user interfaces to the application.

10. The method of claim 9 wherein:

the interfaces include a telephony user interface and a graphical user interface.

11. The method of claim 6 wherein:

the plurality of user interfaces comprise
user interfaces of a plurality of types of user access devices to a same application; and
storing at least one description document defining a user interface comprises
storing a plurality of description documents defining the plurality of user interfaces to the application.

12. The method of claim 11 wherein:

the interfaces include a telephony user interface and a graphical user interface.

13. The method of claim 6 wherein:

the plurality of user interfaces share a common description document.

14. The method of claim 13 wherein:

the interfaces include a telephony user interface and a graphical user interface.

15. The method of claim 1 wherein:

reflecting comprises
downloading the description documents,
parsing the description documents into their constituent elements, and
generating a corresponding node in the instance of the object model for each of the constituent elements.

16. The method of claim 1 wherein:

the layout objects are user-interface-dependent objects, and
the connector objects are user-interface-independent objects.

17. The method of claim 1 wherein:

the layout objects are access-device-specific and application-neutral objects, and
the connector objects are application-specific and access-device-neutral objects.

18. The method of claim 1 wherein:

storing at least one description document comprises
generating at least one description document by using a software developer's kit, software tools, and a definition of the user interface object model.

19. The method of claim 18 wherein:

each step of storing a plurality of objects comprises
generating the plurality of objects by using the software developer's kit, the software tools, and the definition of the user interface object model.

20. The method of claim 1 wherein:

the one or more definition elements define at least one of a menu, a prompt, and a command, and the one or more interaction elements define features of the application.

21. The method of claim 1 wherein:
storing at least one description document defining a user interface comprises
storing a plurality of description documents defining a plurality of different user interfaces and each comprising one or more definition elements; and
storing a plurality of layout objects comprises
storing a plurality of layout objects each comprising a renderer for rendering a different definition element of the plurality of user interfaces.

22. The method of claim 21 wherein:
the plurality of user interfaces includes a telephony user interface and a graphical user interface.

23. The method of claim 1 wherein:
each step of making interfaces accessible comprises
registering interfaces of the downloaded objects in the instance of the object model.

24. An apparatus for implementing a user interface to an application, comprising:
a memory for storing (a) a description document conforming to a user interface object model, defining a user interface and comprising one or more definition elements, (b) a description document conforming to the user interface object model, defining interaction of the user interface with the application and comprising one or more interaction elements, (c) a plurality of layout objects each comprising a renderer for rendering a different definition element, and (d) a plurality of connector objects each comprising a renderer for rendering a different interaction element; and
processor for connecting to the memory and for (a) reflecting the description documents into the object model to generate an instance of the object model defining the user interface and comprising the definition elements and the interaction elements of the description documents, (b) forming a layout engine for the user interface by downloading from the memory layout objects corresponding to the definition elements in the instance of the object model, (c) forming a connector engine for the user interface by downloading from the memory connector objects corresponding to the interaction elements in the instance of the object model, (d) making interfaces of the downloaded layout objects accessible to the corresponding definition elements, (e) making interfaces of the downloaded connector objects accessible to the corresponding interaction elements, and (f) rendering the user interface via the layout engine and the connector engine by invoking execution of said each downloaded object with its corresponding element from the object model to cause the object to render the element.

25. A method of implementing a user interface comprising:
storing one or more description documents defining at least one user interface and comprising definitions of elements of the at least one user interface;
storing a plurality of objects each comprising a renderer for rendering a different one of the elements;
forming a renderer of a selected user interface from objects of the plurality of objects that correspond to the elements of at least one description document of the stored description documents that defines the selected user interface; and
rendering the selected user interface by executing the renderer; wherein:
storing one or more description documents comprises
storing one or more description documents defining the at least one user interface and comprising one or more definition elements, and
storing one or more description documents defining interactions of the at least one user interface with at least one application and comprising one or more interaction elements;
storing a plurality of objects comprises
storing a plurality of layout objects each comprising a renderer for rendering a different one of the definition elements, and
storing a plurality of connector objects each comprising a renderer for rendering a different one of the interaction elements;
forming a renderer comprises
forming a layout engine for the selected user interface from layout objects that correspond to the definition elements of at least one description document that defines the selected user interface, and
forming a connector engine for the selected user interface from layout objects that correspond to the interaction elements of at least one description document that defines interaction of the selected user interface with a selected application; and
rendering the selected user interface comprises
rendering the selected interface to the selected application by executing the layout engine and the connector engine.

26. The method of claim 25 wherein:
rendering the selected interface to the selected application by executing the layout engine and the connector engine comprises
passing each element of the description documents that define the selected user interface and its interaction with the selected application to the corresponding object and executing said object to render said element.

27. An apparatus that effects the method of any one of the claims 1–15, 16–23, and 26.

28. A computer-readable medium containing instructions which, when executed in a computer, cause they computer to perform the method of any one of the claims 16–23, and 26.

29. The method of claim 25 wherein:
rendering comprises
passing each element definition from the at least one description document that defines the selected user interface to the corresponding object and executing said object to render the element.

30. An apparatus for implementing a user interface, comprising:
storage for storing (a) one or more description documents defining at least one user interface and comprising definitions of elements of at least one user interface, and (b) a plurality of objects each comprising a renderer for rendering a different one of the elements; and
a processor for connecting to the storage and (c) forming a renderer of a selected user interface from objects of the plurality of objects that correspond to the elements of at least one description document of the stored description documents that defines the selected user interface, and (d) rendering the selected user interface by executing the renderer; wherein:
the storage stores (a)(i) one or more description documents defining at least one user interface and comprising one or more definition elements, (a)(ii) one or more description documents defining interactions of the at least one user interface with at least one application and comprising one or more interaction elements, (b)(i) a plurality of layout objects each comprising a renderer for rendering a different one of the definition elements, and (b)(ii) a plurality of connector objects each comprising a renderer for rendering a different one of the interaction elements; and the processor forms (c)(i) a layout engine for the selected user interface from layout objects that correspond to the definition elements of at least one description document that defines the selected user interface and (c)(ii) a connector engine for the selected user interface from layout objects that correspond to the interaction elements of at least one description document that defines interaction of the selected user interface with a selected application, and (d) renders the selected interface to the selected application by executing the layout engine and the connector engine.

31. The apparatus of claim 30 wherein:

the processor renders the selected user interface by passing each element definition from the at least one description document that defines the selected user interface to the corresponding object and executes said object to render the element.

32. The apparatus of claim 30 wherein:

the processor renders the selected user interface to the selected application by passing each element of the description documents that define the selected user interface and its interactions with the selected application to the corresponding object and executing said object to render said element.

33. An apparatus for implementing a user interface to an application, comprising:

means for storing at least one description document conforming to a user interface object model, defining a user interface and comprising one or more definition elements;

means for storing at least one description document conforming to the user interface object model, defining interaction of the user interface with the application and comprising one or more interaction elements;

means for storing a plurality of layout objects each comprising a control renderer for rendering a different definition element;

means for storing a plurality of connector objects each comprising a control renderer for rendering a different interaction element;

means for reflecting the description documents into the object model to generate an instance of the object model defining the user interface and comprising the definition elements and the interaction elements of the description documents;

means for forming a layout engine for the user interface by downloading from storage layout objects corresponding to definition elements in the instance of the object model;

means for making interfaces of the downloaded layout objects accessible to the corresponding definition elements;

means for forming a connector engine for the user interface by downloading from storage connector objects corresponding to interaction elements in the instance of the object model;

means for making interfaces of the downloaded connector objects accessible to the corresponding interaction elements; and means for rendering the user interface via the layout engine and the connector engine by passing each element in the instance of the object model to the corresponding downloaded object and executing said object to cause the object to render the element.

* * * * *